United States Patent [19]

Anderson

[11] Patent Number: 4,904,109
[45] Date of Patent: Feb. 27, 1990

[54] INTERLOCKING STRUCTURAL MEMBERS EMPLOYING TRANSVERSE LOCKING WEDGES

[75] Inventor: Robert E. Anderson, Huntington Station, N.Y.

[73] Assignee: Grumman Aerospace Corporation, Bethpage, N.Y.

[21] Appl. No.: 131,699

[22] Filed: Dec. 11, 1987

[51] Int. Cl.[4] ............................................. F16B 2/14
[52] U.S. Cl. ................................... 403/374; 403/254; 403/409.1; 244/132; 244/123
[58] Field of Search ..................... 403/256, 254, 409.1, 403/374; 244/132, 123

[56] References Cited

U.S. PATENT DOCUMENTS 251,094 12/1881 Carr ..................................... 403/256
3,974,621 8/1976 Stang ................................... 403/409

Primary Examiner—Andrew V. Kundrat
Assistant Examiner—Carol I. Bordas
Attorney, Agent, or Firm—Pollock, VandeSande & Priddy

[57] ABSTRACT

The invention relates to an expansion fastener device that secures two interlocking members together. The device includes a parallelepiped receptacle having slits along opposite ends. The receptacle is inserted through the interlocking members and wedges are driven into the receptacle to cause its expansion in horizontal and vertical directions. This secures the members together along relatively large shear areas thereby decreasing the possibility of shear damage to the members.

3 Claims, 4 Drawing Sheets

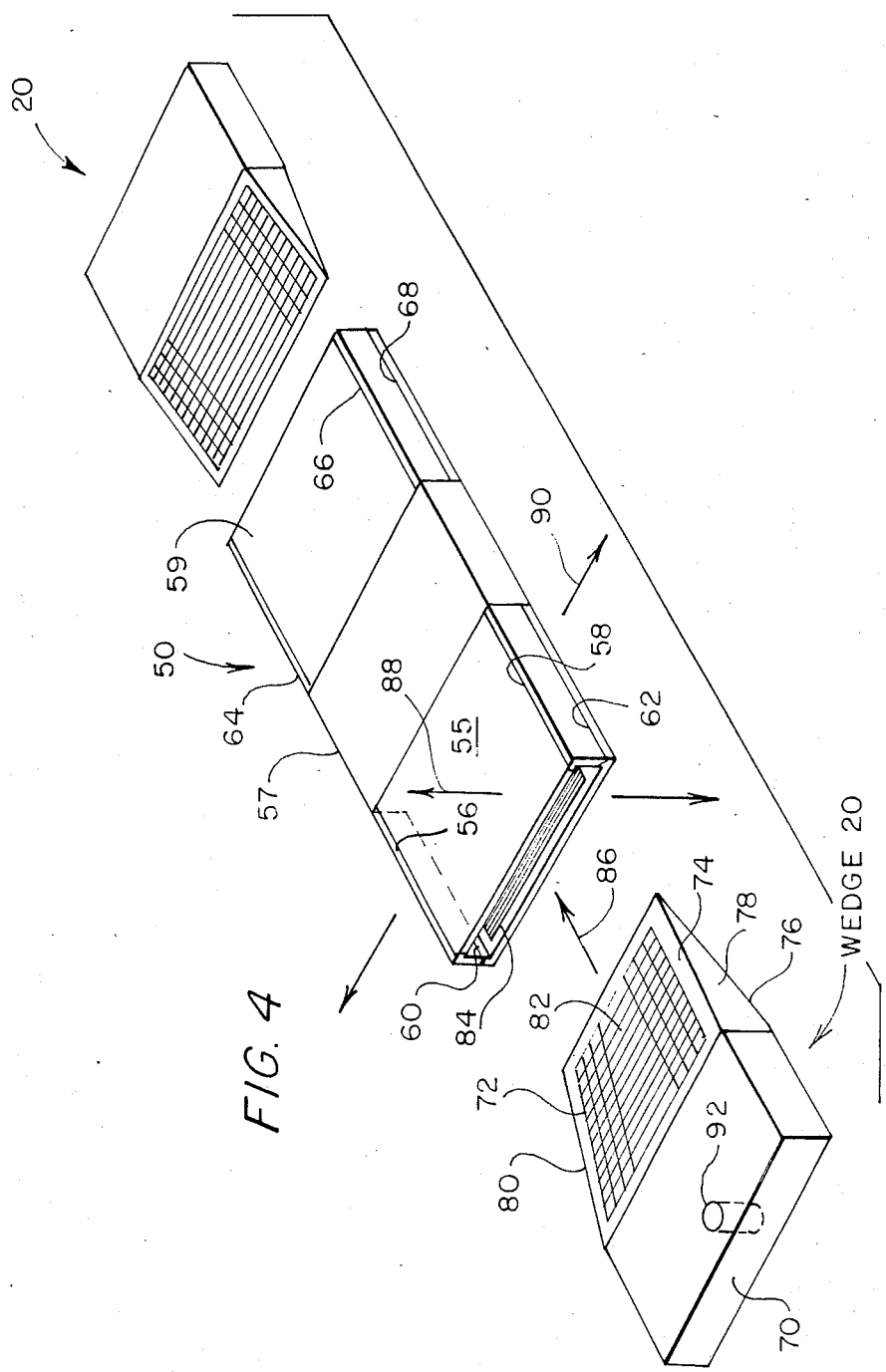

INTERLOCKING STRUCTURAL MEMBERS EMPLOYING TRANSVERSE LOCKING WEDGES

FIELD OF THE INVENTION

The present invention relates to a fastenerless joint, and more particularly to such a joint for composite aircraft structures.

BRIEF DESCRIPTION OF THE PRIOR ART

In many fabrication applications laminated structures are attached to support structures by common fastening techniques. In one particular application, composite laminated aircraft wing skins are attached to a support substructure by means of rivets. Within the aircraft environment this creates several problems. In the first place, the rivets passing through the various plies of the laminated structures create stress forces which could cause rupture and ultimate destruction of the aircraft.

In modern fabrication techniques for composite aircraft skins, fuel or other liquids are often contained within the skin so that the aircraft structure itself creates a reservoir for the fluid. A serious problem with current construction techniques utilizing fasteners is the presence of leaks where rivets penetrate the composite laminate.

For these and other reasons, it would be highly desirable to create a mechanical joint between aircraft composite laminated skin structures and support subassemblies without the utilization of discrete fasteners.

BRIEF DESCRIPTION OF THE INVENTION

The present invention utilizes a wedge assembly for mechanically interlocking a composite aircraft wing skin structure to a support substructure.

Hollowed projections are formed in rows from the wing skin laminate and these receive mating recesses in a composite wing substructure so that interdigitation of the wing skin structure and support substructure results. The interdigitating members are hollow so that a plurality of transversely positioned expansion wedges may be slid through the interdigitating members thereby locking the members together and strongly resisting delamination which often occurs along a plane between the wing skin structure and the support substructure of conventional assemblies.

Further advantages of the present invention relate to automated precut material use which lends itself to rapid repeatable production and reduction of layup time. The tooling required is relatively uncomplicated, which serves as a distinctive economic advantage of the invention.

BRIEF DESCRIPTION OF THE FIGURES

The above-mentioned objects and advantages of the present invention will be more clearly understood when considered in conjunction with the accompanying drawings, in which:

FIG. 4 is a perspective view of the wedge and receptacle locking means as employed in the present invention.

DETAILED DESCRIPTION OF THE INVENTION

Figure 1:
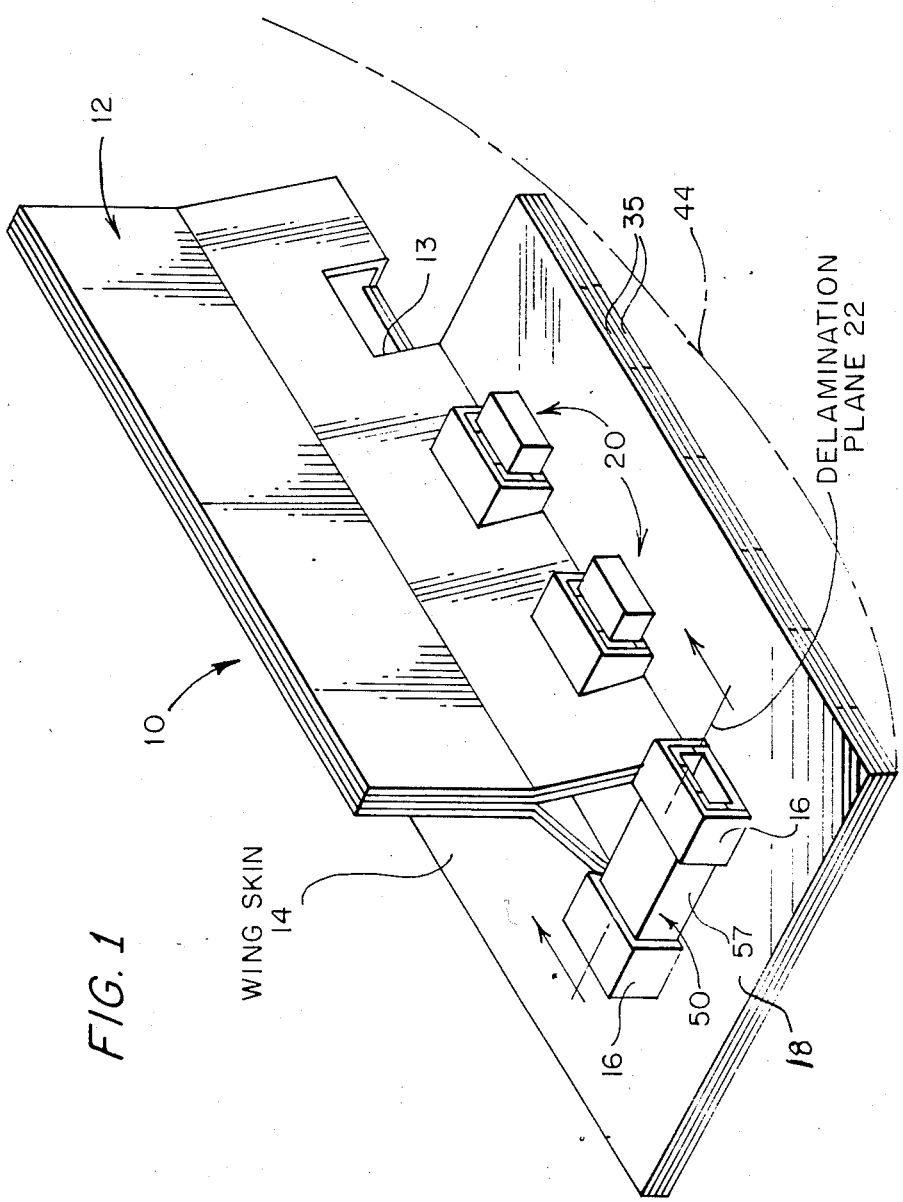
FIG. 1 is a perspective view illustrating interlocking engagement between a wing skin structure and support substructure in accordance with the present invention.
Figure 3:
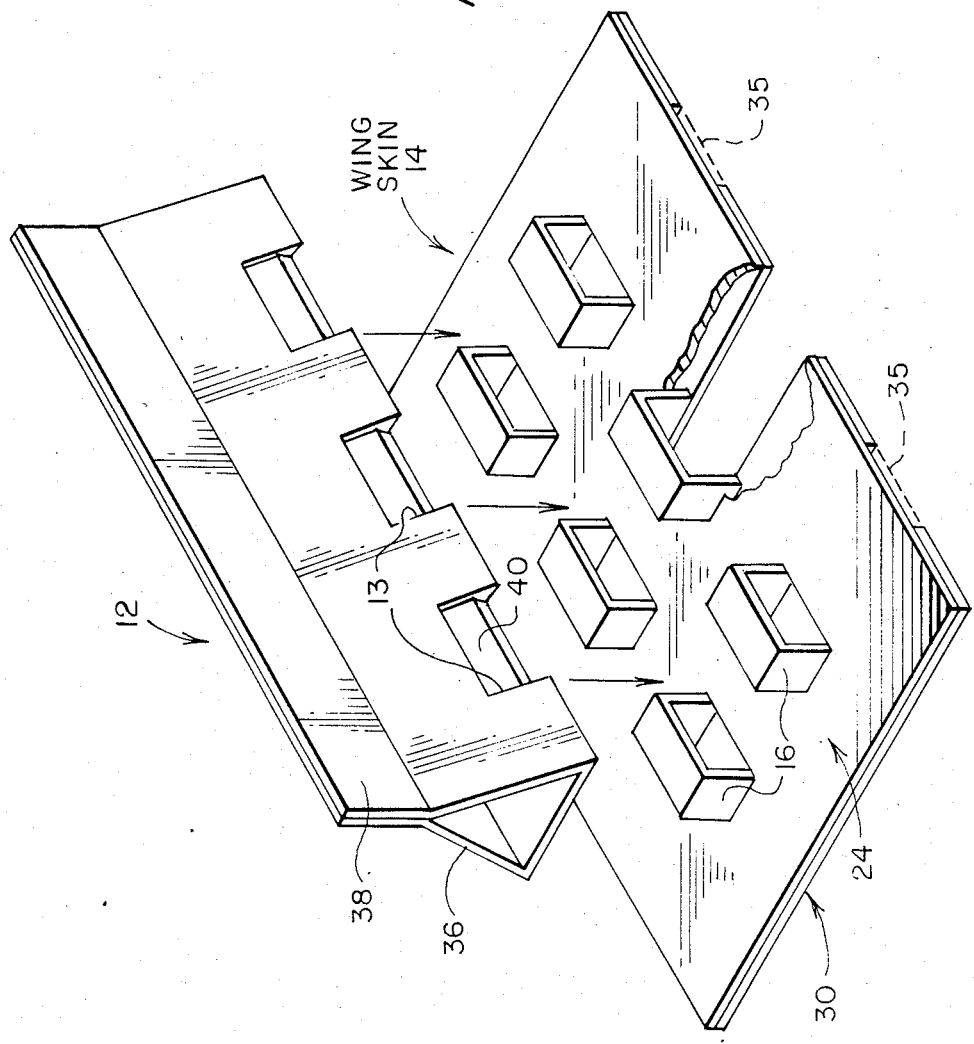
FIG. 3 is a disassembled view of a wing skin structure and support substructure in accordance with the present invention.

Reference is made to FIG. 1 wherein interlocking engagement between a wing skin structure and support substructure is illustrated in a manner similar to that of my co-pending application Ser. No. 306,199. The interlocking members are generally indicated by reference numeral 10 and are seen to include a wing support substructure 12 secured to a wing skin structure 14. In order to achieve the interlocking engagement between members 12 and 14, hollowed projections 16 see FIG. 3 are formed in the wing skin structure 14 and for illustrative purposes are indicated as two parallel spaced rows extending longitudinally. A greater number of rows could, of course, be present. The wing support substructure 12 has, along a triangular base portion, slots 13 formed therein so that the spacing between the slots is the same as the spacing between longitudinally extending adjacent projections. The slots 13 receive corresponding projections 16 so that the engaging portions form interdigitations. The triangular base portion of the substructure 12 and the projections 16 are hollowed so that a transversely positioned wedge 20 can slide through transversely aligned projections to secure interlocking engagement between the substructure 12 and the projections 16. The wedge securement is the particular improvement of the present invention and is discussed in greater detail in connection with FIG. 4. If the wing skin structure 14 and the wing support substructure 12 were connected in conventional fashion by rivets, a delamination plane would exist at the interface between wing skin structure and support substructure, as indicated by reference numeral 22. When rivet construction is used, a danger exists that sufficient stress upon the wing skin structure will delaminate or separate the wing skin structure 14 from the wing support substructure 12. The transverse orientation of the wedges 20 along the longitudinal interface between wing skin structure 14 and wing support substructure 12 greatly increases an aircraft's ability to resist delamination.

It is to be noted that the wing support substructure 12 is shown mounted in longitudinal offset relationship to the wing skin structure 14 so that details of the invention are better illustrated. In actual utilization of the invention, the substructure 12 would be shifted to more completely overlie the wing skin structure 14.

Figure 2:
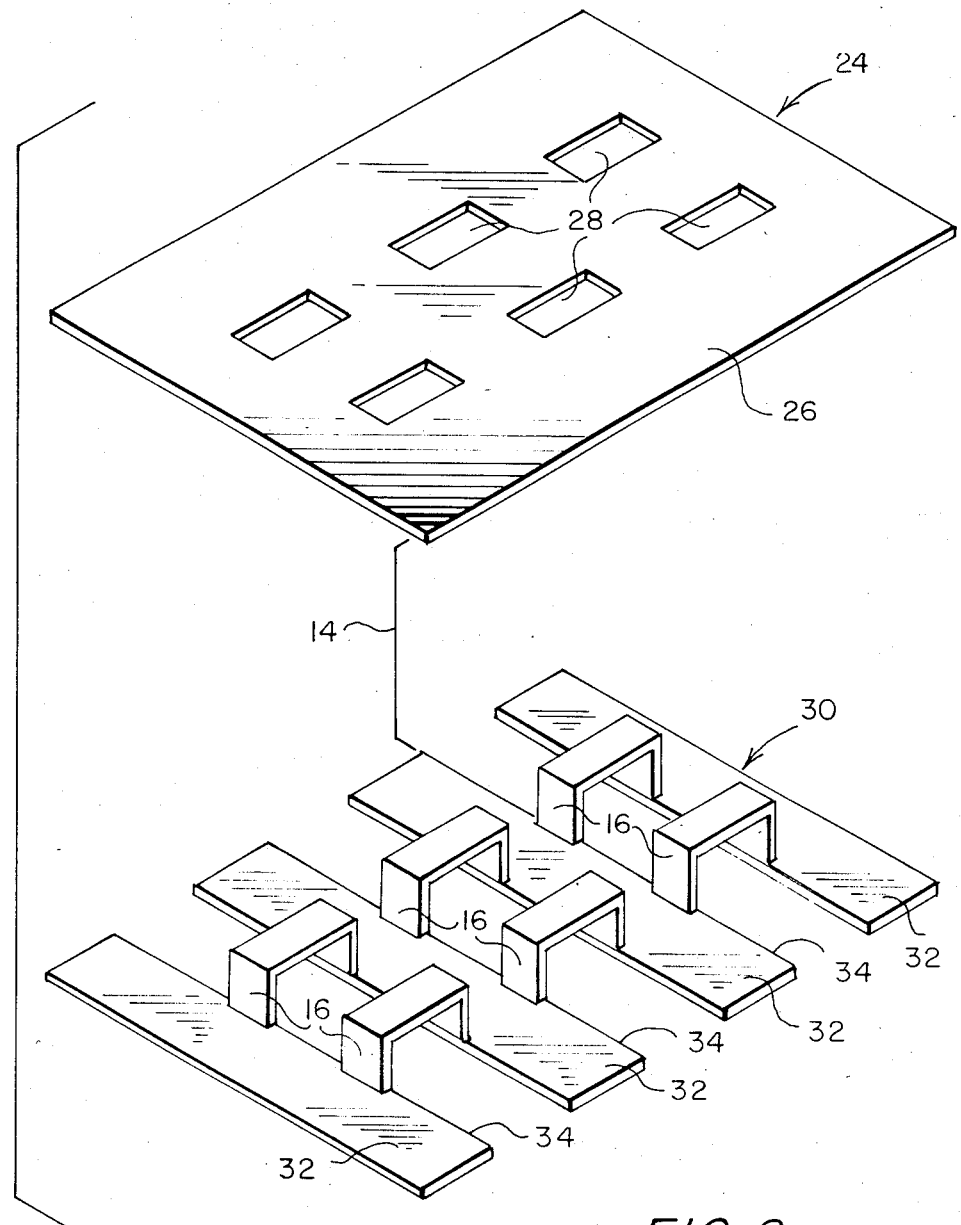
FIG. 2 is a disassembled view of top and bottom ply members constituting an elementary wing skin structure.

In order to better appreciate the construction of the present invention, reference is made to FIG. 2 wherein a top ply for the wing skin structure is generally indicated by reference numeral 24. The ply may be fabricated from a Fiberglass sheet 26 or from a number of conventional composite materials. For simplicity of explaining the invention, only six spaced openings 28 are illustrated. These openings appear as two parallel rows, the rows having a series of transversely aligned opening pairs of rectangular shape. A bottom ply 30 is fabricated from a sheet 32 of appropriate material such as Fiberglass or selected composite material. The sheet 32 is interrupted by parallel spaced longitudinal medial openings 34 bridged by integrally formed connecting projection pairs 16 spaced to be in registry with corresponding openings 28.

By lowering the top ply 24 over the bottom ply 30 so that projections 16 respectively project upwardly through corresponding openings 28, the two plies become geometrically locked, as indicated by the completed wing skin structure 14 in FIG. 3. As is the case in existing composite aircraft laminated structures, the individual plies are impregnated with resin and cured. Conventional pre-impregnated resins may be successfully used in accordance with known practices.

It should be observed that FIGS. 2 and 3 illustrate the wing skin structure as being fabricated from a single top and bottom layer. However, this has been done to simplify the explanation of the invention. In order to achieve desired structural strength, it is anticipated that several sets of top and bottom layers will be necessary. Accordingly, FIG. 1 has been illustrated for an example where two sets of top and bottom plies have been employed.

If the wing skin is desired to be of uniform thickness, strips 35 are positioned in the medial openings 34, as indicated in FIGS. 1 and 3.

The final construction of the invention will now be explained in connection with FIG. 3. The wing support substructure 12 is shown as fabricated from two plies of resin-impregnated fabric which, like the wing skin structure, may be made of Fiberglass or other suitable composite, the layers being folded over one another to form the flat portion 38. The lower portion of the wing support structure is formed as a closed, hollowed triangular portion, indicated by reference numeral 36 and including a base section 40.

In order to fabricate the composite wing skin structure and composite wing support substructure as rigid load-supportable members, the resin impregnation of the composite fabrics must be cured. In this regard the wing skin structure 14 is cured separately from the support substructure 12 and then they are assembled. A separate wedge 20 is passed through each respective projection 16 to lock the wing skin structure and support substructure together.

In order to increase the substructure's resistance to shear forces, a strip of material may be laced through the flat portion 38 in a manner detailed in my co-pending application Ser. No. 53,199.

The utilization of transverse locking means for securing composite wing skin structure and support substructure is disclosed in my previously mentioned co-pending U.S. Pat. application Ser. No. 306,199. The thrust of the present invention is the utilization of wedges in combination with an expandable receptacle for achieving the transverse locking of wing skin to support substructure. In my co-pending application, the wing skin and support substructure are held together by a simple trapezoidal locking bar which slides through projections 16, which are likewise formed in a trapezoidal cross section. The utilization of a simple locking bar is particularly appropriate where the wing skin and support substructure (both resin-impregnated) are co-cured. When this is accomplished, the bonding between the wing skin and support substructure is significant and the locking bar provides additional securement.

However, the present invention is intended for applications where the wing skin structure and support substructure are intended to be separately cured and, therefore, the locking of these structures together must rely totally upon wedges 20. The advantage of the present locking arrangement is that the wing skin structure and support substructure may be separately fabricated and assembled later on. Likewise, it is possible to remove the wedges 20 and disassemble the wing skin structure from the support substructure if this becomes necessary.

Referring back to FIG. 1 it will be seen that each, projection 16 receives a wedge 20. Transversely opposite wedges 20 are actually force, fitted into the opposite ends of a receptacle 50 (FIG. 4) to expand the receptacle walls into engagement with the projections 16, thereby locking the wing skin structure 14 to the support substructure 12.

In greater detail, FIG. 4 indicates that the receptacle 50 is characterized by two opposite end sections 55 and 59 and a central section 57. The end section 55 includes slotted edges 56, 58, 60 and 62 to allow vertical and horizontal expansion of the receptacle walls, outwardly, after insertion of the adjacently positioned wedge 20. The central section 57 includes no such slotted edges. Similarly, the end section 59 includes slotted edges 64, 66, and 68 as well as the hidden remaining slotted edge.

The wedge 20 is preferably fabricated from a solid body and includes a parallelepiped section 70 extending to a tapered section 72. The tapered section 72 includes an inclined upper surface 74 and a lower inclined surface 76 as well as inwardly tapering sides 78 and 80. The upper and lower surfaces 74 and 76 include ridges 82 to engage corresponding tapered ridged surfaces 84 on interior upper and lower walls of end sections 55 and 59 of receptacle 50. The interior side walls may be inwardly tapered to intimately contact wedge walls 78 and 80.

In order to assemble a wing skin structure 14 to a support substructure 12, receptacles 50 are inserted through each pair of transversely aligned projections 16 after substructure 12 and wing skin 14 are joined. The central section 57 is medially disposed in the space 18 between each of the projection pairs (FIG. 1) while the end sections 55 and 59 are received within corresponding projections. Each wedge 20 is driven into a corresponding end section, in the direction indicated by reference numeral 86. Upon insertion of a wedge 20, a corresponding end section will vertically expand (88) and horizontally expand (90). A press fit will therefore result between the receptacle 50 and each pair of corresponding retaining projections 16. After the wedges 20 have been inserted, the wing skin structure 14 is securely fastened to the support substructure 12. However, if disassembly of the wing skin structure from the support structure is necessary, the wedges 20 may be pulled from the receptacles 50 thereby allowing the resulting contacting receptacle to be removed. In order to expedite such removal, a bore 92 may be formed. in each wedge 20 to permit the insertion of a pulling tool (not shown).

By utilizing wedges 20, close tolerance fits are achieved between the wing skin structure and support substructure so that minute sliding therebetween is inhibited. As a result, deformation of the mating parts is minimized. The close fit tolerance also avoids fastener bending which is not uncommon in high speed aircraft utilizing rivet construction. A further advantage of the present construction is the presence of a large rectangular interface area between the base of the support substructure 12 and wing skin structure 14 resists buckling as compared to joints where rivets or the like are used.

In a finally assembled aircraft, the wing support substructure 12 and projections 16 are positioned internally of the wing. The underside of the wing skin structure 14, opposite the surface illustrated, will form the exterior surface of the wing skin. The utilization of transverse locking means, namely the wedges 20 within projections 16, offer the capability of securely fastening the wing support 12 to the wing skin 14 even in the event that the wing skin 14 should have a contour, such as indicated by 44, instead of the planar appearance as indicated in the figure. A further distinctive advantage of the transversely located locking means is the fact that rotational (hinge) rotation of the wing skin 14, relative to the wing support 12, is minimized.

Although the present invention has been explained in connection with projections 16 of rectangular cross section and a triangular-based wing support substructure 12, this has been done to simplify the explanation and is only illustrative. Other mating shapes may be similarly employed.

As will be appreciated by virtue of the connection of wing skin structure 14 to wing support substructure 12, without the aid of rivets, high stress points and leakage points between the two structures are eliminated.

Although the present invention has been described in terms of a fastenerless joint for securing an aircraft wing skin to a support structure, it should be appreciated that the invention contemplates other applications. Thus, the following claims envision general utilization of projections from a first laminated structure to form interdigitations with a support substructure to achieve a secure joint therebetween. Specifically, the present invention is envisioned for applications to securing other aircraft skin sections to support substructures, in addition to a wing skin as discussed herein.

It should be understood that the invention is not limited to the exact details of construction shown and described herein, for obvious modifications will occur to persons skilled in the art.

I claim:
1. An expansion fastener comprising:
 a hollow parallelepiped receptacle having
  (a) a central section having slitted open ends to permit expansion of the ends in the horizontal and vertical directions;
 a wedge having a rectangular cross section inserted into each end to force expansion thereof, each wedge having
  (a) tapered surfaces for contacting mating tapered surfaces formed inwardly of the receptacle ends;
  (b) ridges formed on the tapered surfaces of the wedge for engaging mating ridges on the receptacle tapered surfaces.

2. The expansion fastener set forth in claim 1 together with a first structural member having at least one pair of aligned hollow projections;
 a second hollowed structural member seated against the first structural member in the space between projections;
 the expansion receptacle inserted through the projections and the second hollowed structural member for locking them together;
 the wedge expanding the receptacle for fastening the receptacle in its locking position.

3. The structure set forth in claim 2 wherein the first structural member is an aircraft skin structure and the second structural member is a support substructure, removal of wedges from the receptacle permitting disassembly of the skin structure from the support substructure.

* * * * *